Aug. 26, 1958 — P. WEINBERGER — 2,849,055
CIRCULAR SINUOUS SPRING SEAT
Filed Jan. 23, 1952 — 3 Sheets-Sheet 1
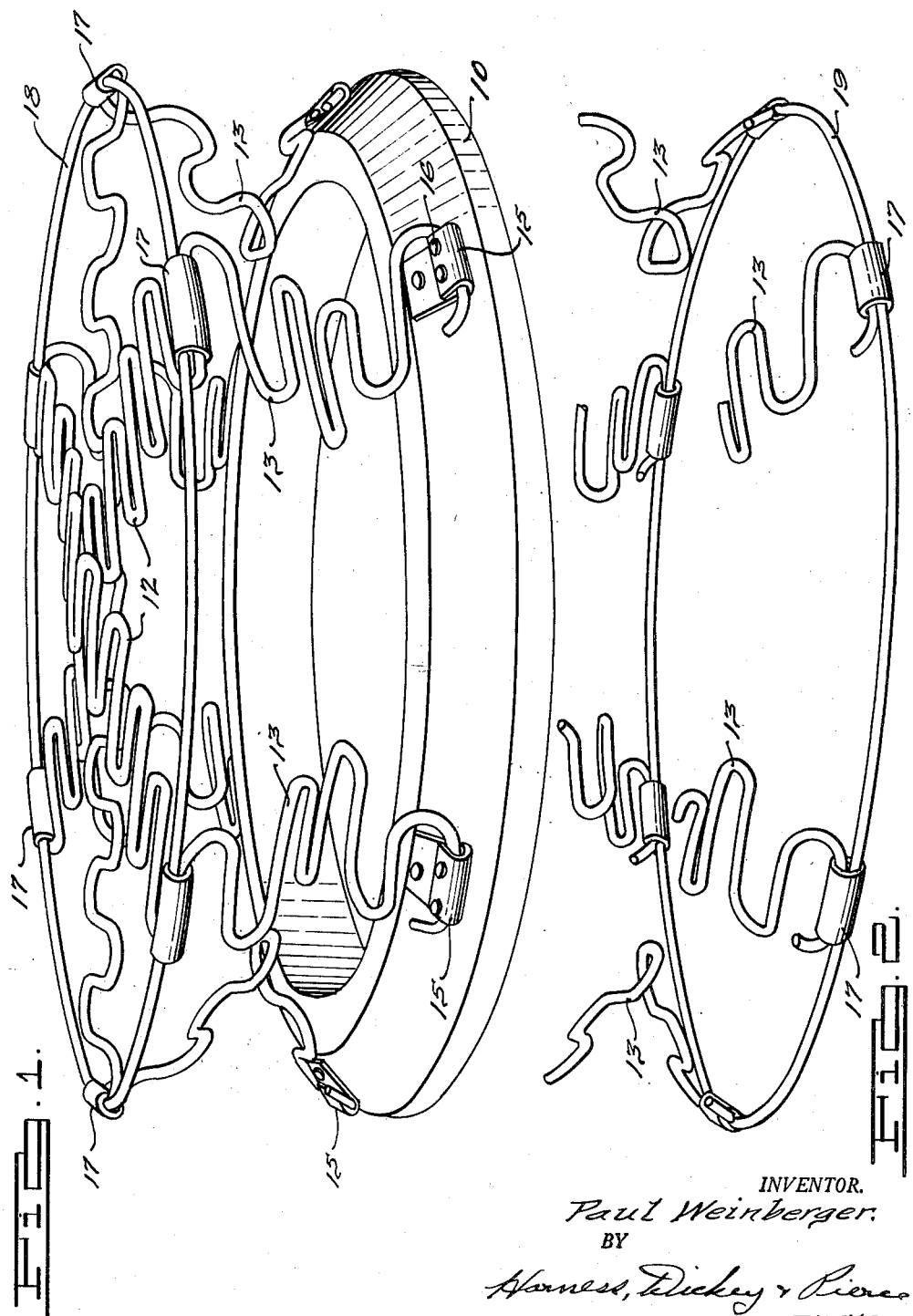
INVENTOR.
Paul Weinberger
BY
Harness, Dickey & Pierce
ATTORNEYS.

Aug. 26, 1958 P. WEINBERGER 2,849,055
CIRCULAR SINUOUS SPRING SEAT
Filed Jan. 23, 1952 3 Sheets-Sheet 2
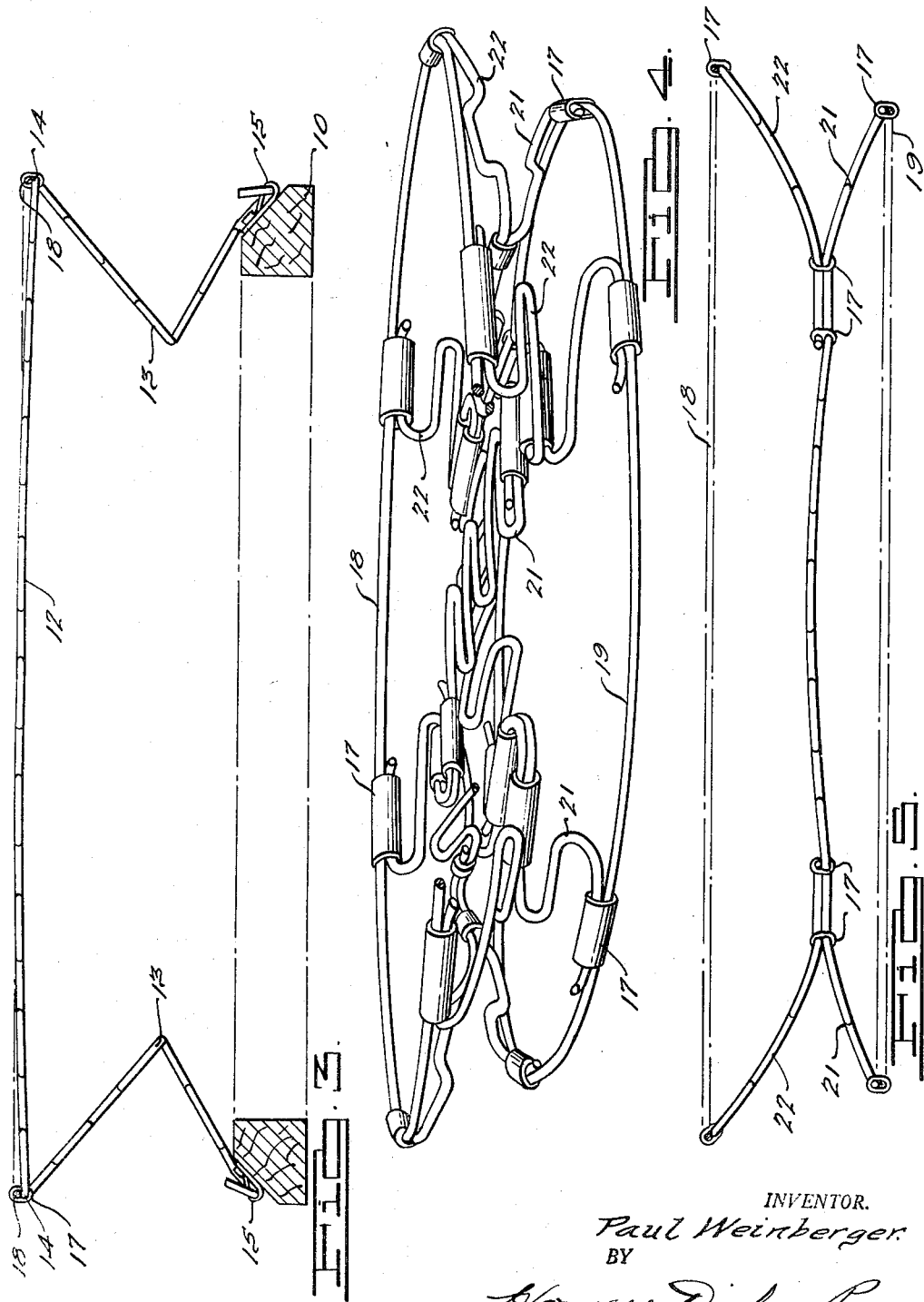
INVENTOR.
Paul Weinberger.
BY
Harness, Dickey & Pierce
ATTORNEYS.

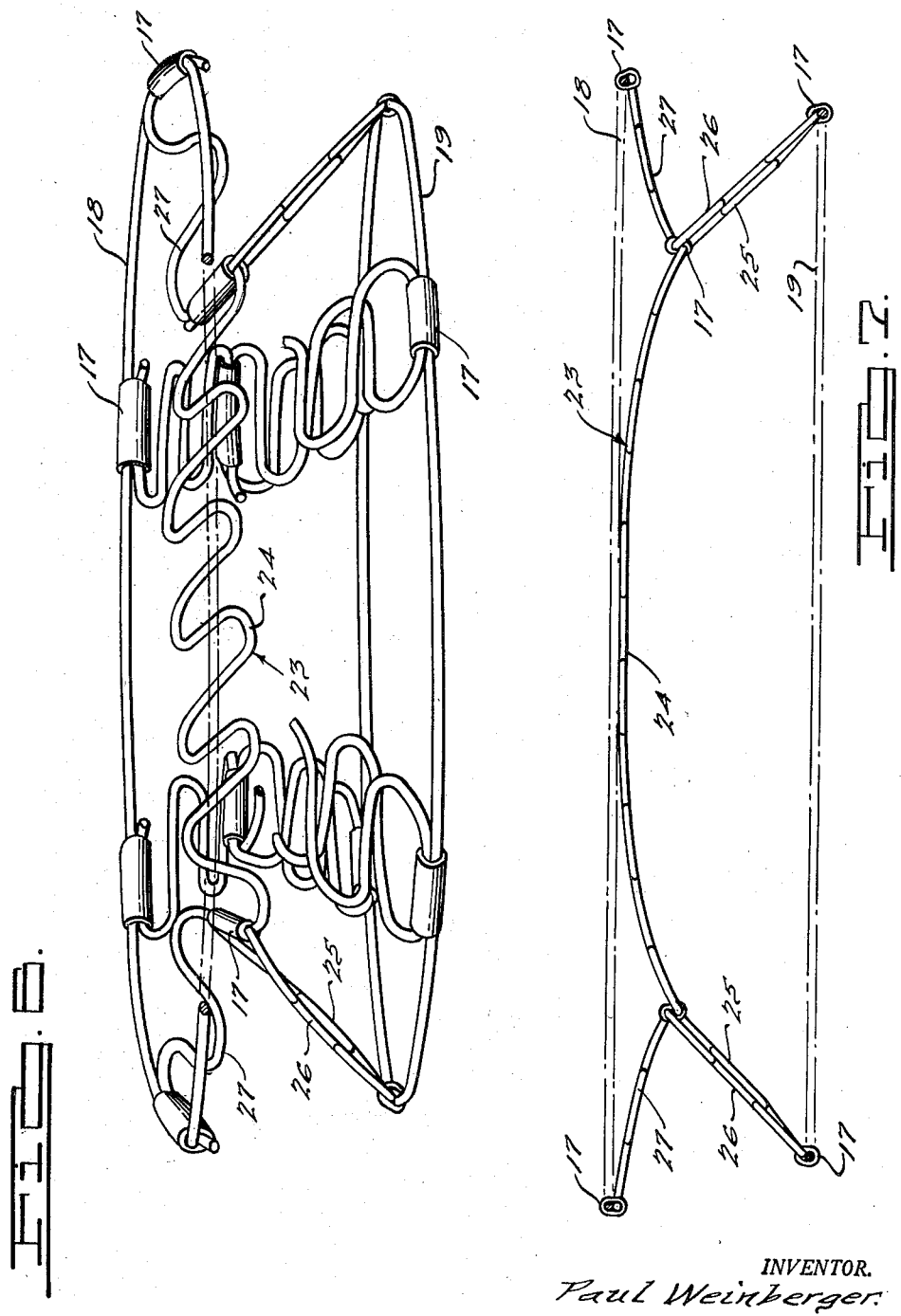

United States Patent Office 2,849,055
Patented Aug. 26, 1958

2,849,055

CIRCULAR SINUOUS SPRING SEAT

Paul Weinberger, Garden City, Mich., assignor to No-Sag Spring Company, Warren Township, Mich., a corporation of Michigan Application January 23, 1952, Serial No. 267,789

3 Claims. (Cl. 155—179)

This invention relates to spring constructions, and particularly to a circular spring construction for a circular seat, stools and the like.

Difficulty has been experienced heretofore in preparing a circular spring construction for circular seats, stools and the like. The present invention has overcome this difficulty by employing sinuous springs formed in such manner as to cover the circular area to support a load while providing all-round soft edge construction to the assembly.

Accordingly, the main objects of the invention are: to form a circular assembly of springs for supporting a load on a seat or stool; to pre-form a plurality of springs and assemble the springs in crossed relation in a manner to provide a circular load supporting portion, with soft edge construction about the peripheral edge of the assembly; to pre-form a plurality of springs and assemble the springs in crossed relation to form a unit assembly which may be applied to a round seat or stool top for resiliently supporting a load, and, in general, to provide an assembly of springs for a round seat or stool top which is simple in construction and economical of manufacture.

Other objects and features of novelty of the invention will be specifically pointed out or will become apparent when referring, for a better understanding of the invention, to the following description taken in conjunction with the accompanying drawings, wherein:

Figure 1 is a perspective view of a seat or stool ring having a circular spring assembly attached thereto;

Fig. 2 is a broken view of the structure illustrated in Fig. 1, with the spring assembly attached to a wire ring;

Fig. 3 is a sectional view showing one of a plurality of formed springs employed in the seat construction illustrated in Fig. 1;

Fig. 4 is a view of structure, similar to that illustrated in Fig. 2, showing a further form which the invention may assume;

Fig. 5 is a sectional view showing one of the spring elements employed in the construction illustrated in Fig. 4;

Fig. 6 is a broken view of structure, similar to that illustrated in Fig. 2, showing another form which the invention may assume, and Fig. 7 is a view in elevation of one of the spring elements in the assembly of the springs illustrated in Fig. 6.

Referring to Figs. 1 and 3, a spring assembly is illustrated for a circular seat or stool, wherein a supporting ring 10 of wood is illustrated. This may be the top of a seat or stool, ar may be a separate element which is nailed or otherwise secured theerto. A plurality of sinuous spring strips, as illustrated more specifically in Fig. 3, are formed to have a top load supporting portion 12, with V-shaped supporting portions 13 at each of the ends from which they are reversely bent at 14. A plurality of such spring strips, herein illustrated as three in number, have the opposite ends secured by clips 15 to the ring 10 by suitable means, herein illustrated as by nails 16. The two ends of each spring strip are disposed diametrically opposite to each other, with the ends of the springs alternately disposed so as to have the clips 15 located 60° apart. The load supporting portions 12 of the springs cross each other in the center of the assembly, as illustrated in Fig. 1, with the reversely bent end portions 14 joined by suitable bands 17 to a top wire ring 18. The wire ring 18 outlines the top area of the load supporting portion and the three top sections of the spring adequately support the load within the ring 18 which is deflectable to provide a soft edge construction.

A similar spring assembly is illustrated in Fig. 2, with the exception that in place of the wood ring 10 and clips 15, the ends of the V-shaped portions 13 are secured to a second wire ring 19 by a plurality of bands 17. In this arrangement, suitable clips, staples or the like are employed for attaching the wire ring 19 to the top of the circular seat or stool.

In Figs. 4 and 5, a further form of construction is illustrated, that wherein arched zigzag spring strips 21 are secured by bands 17 to a wire ring 19. Three of these strips are mounted across the ring 19 in crossed relation centrally of the ring, with the ends of the strips disposed 60° apart, the same as in the construction illustrated in Figs. 1 and 2. Near the end of each of the strips 21, a short section of zigzag spring strip 22 is secured to the strips 21 by bands 17, with the arc of the sections 21 reversely disposed so as to have the ends extend upwardly. The ends of the sections 22 are secured to a top wire ring 18 by the bands 17, providing a construction in which the ring 18 is disposed above the load supporting portion at the center of the assembly which may be filled to a desired height by padding, foam rubber, or the like. This arrangement provides a load supporting portion for a person occupying the seat while also providing soft edges about the periphery defined by the rings 18 which are deflectable on the sections 22.

In Figs. 6 and 7, a still further form of construction is illustrated, that wherein three like formed sections of sinuous spring strips 23 are utilized to form the circular spring assembly. In this arrangement, the load supporting portion 24 is provided with a central arched portion extending upwardly from the downwardly sloping arm portions 25, the ends of which are reversely bent back upon the portions 25 and formed into V-shaped sections having the adjacent arm 26 and the outwardly arched arm 27. Three of the spring strips 23 so formed are assembled on the wire ring 19 by bands 17 in the manner pointed out hereinabove. The load supporting portions 24 cross each other centrally of the assembly while the projecting end portions are secured to the top ring 18 by the bands 17. Bands 17 also secure the apices formed between the arm portions 26 and 27 of the reversely bent portion of the main spring portion to the main portion of the spring strips at the junction of the ends of the load supporting portion 24 and the supporting arm portions 25. In this arrangement, the crossed load supporting portions 24 support the load, while the edge formed by the ring 18 is deflectable upon the arm portions 27, thereby providing a soft edge construction to the assembly.

In any of the constructions, a plurality of the formed sinuous springs have the load supporting portions crossed on the center of the assembly, with the spaced top and bottom peripheral end portions secured respectively to top and bottom ring elements by suitable bands or clips. The simple assembly of formed sinuous spring strips provides a cheap, rugged spring supporting structure for the top of circular seats, stools and the like, which may be directly built thereon or attached thereto after assembly. After assembly of the spring to the seat, stool or top, it is only necessary to apply padding and upholstery material thereto to provide a finished construction. While three spring elements are illustrated in the spring assemblies herein shown and described, it is to be understood that in assemblies for large seats and stool tops, more of the elements would be employed because of the greater diameter and peripheral length of the edge rings.

What is claimed is:

1. A spring assembly comprising a plurality of like formed sinuous spring strips each having a central load supporting portion and upper and lower terminal end portions, said strips having the load supporting portions in crossed relation at the center of the assembly, and upper and lower ring members secured to the upper and lower terminal end portions.

2. In a spring assembly, a plurality of zigzag spring strips formed to have a load supporting portion from the ends of which V-shaped supporting portions are provided having upper and lower terminal ends, an upper ring secured to the upper terminal ends when the strips are disposed to have the load supporting portions cross each other at the center of the assembly, and a bottom ring secured to the bottom terminal ends of the V-shaped portions of the strips.

3. In a spring construction, a plurality of zigzag spring strips having a central load supporting portion from the ends of which V-shaped supporting portions extend downwardly therebeneath, with the apex of the V-portions projecting inwardly, a bottom circular member to which the terminal ends of the V-portions are secured when the springs are disposed in offset angular relation to each other with the load supporting portions in crossed relation to the center of the assembly, and a ring secured to the terminal ends of the load supporting portion at the point from which the V-shaped portions extend to form a border for the top area of the seat which is deflectable.

References Cited in the file of this patent

UNITED STATES PATENTS

| | | |
|---|---|---|
| 2,364,500 | Wolofski | Dec. 5, 1944 |
| 2,498,837 | Gelman | Feb. 28, 1950 |
| 2,526,250 | Matthaei | Oct. 17, 1950 |
| 2,528,950 | Engstrom | Nov. 7, 1950 |
| 2,540,563 | Workman | Feb. 6, 1951 |
| 2,591,185 | Neely | Apr. 1, 1952 |